3 Sheets—Sheet 3
C. E. SACKETT.
Cultivator.
No. 219,116. Patented Sept. 2, 1879.
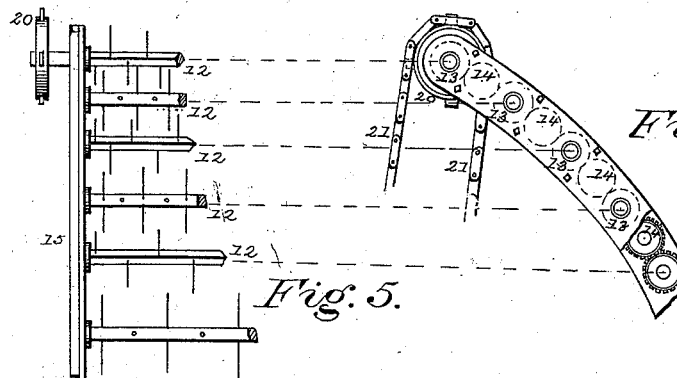
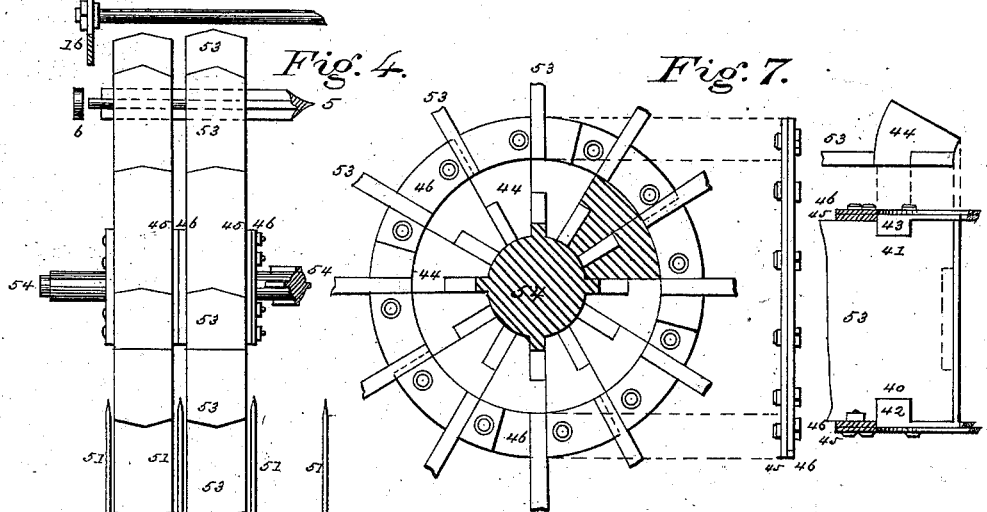
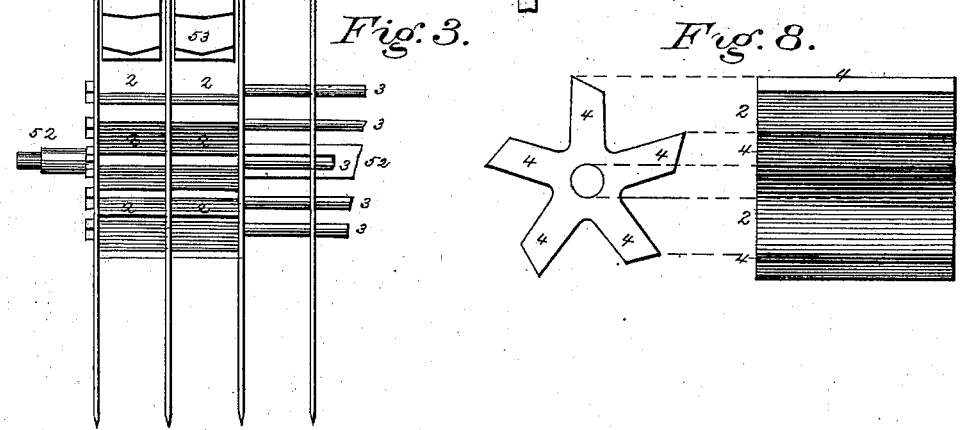
Witnesses:
T. A. Appleby
Frank H. Harnsen
Inventor:
Chas. E. Sackett

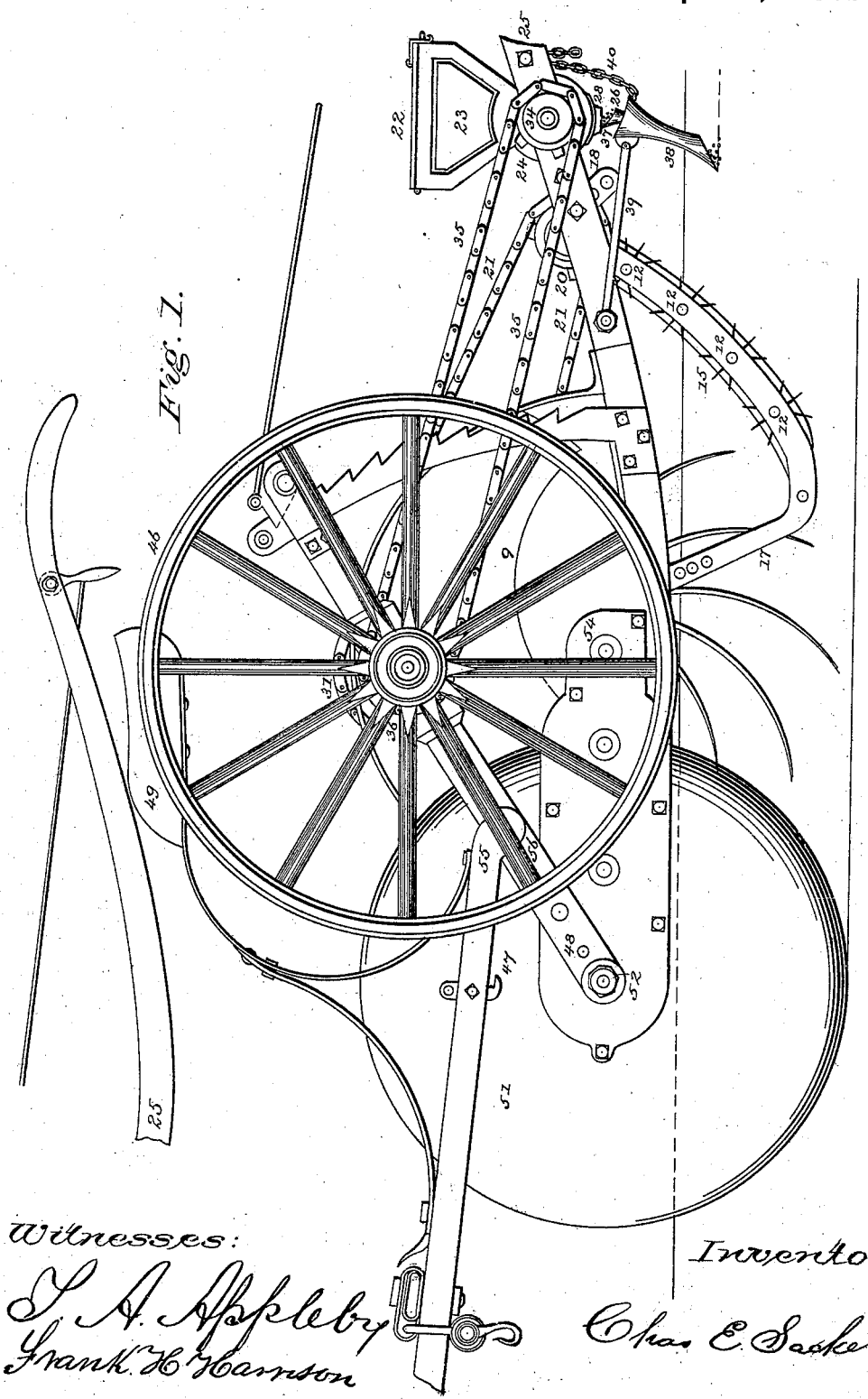

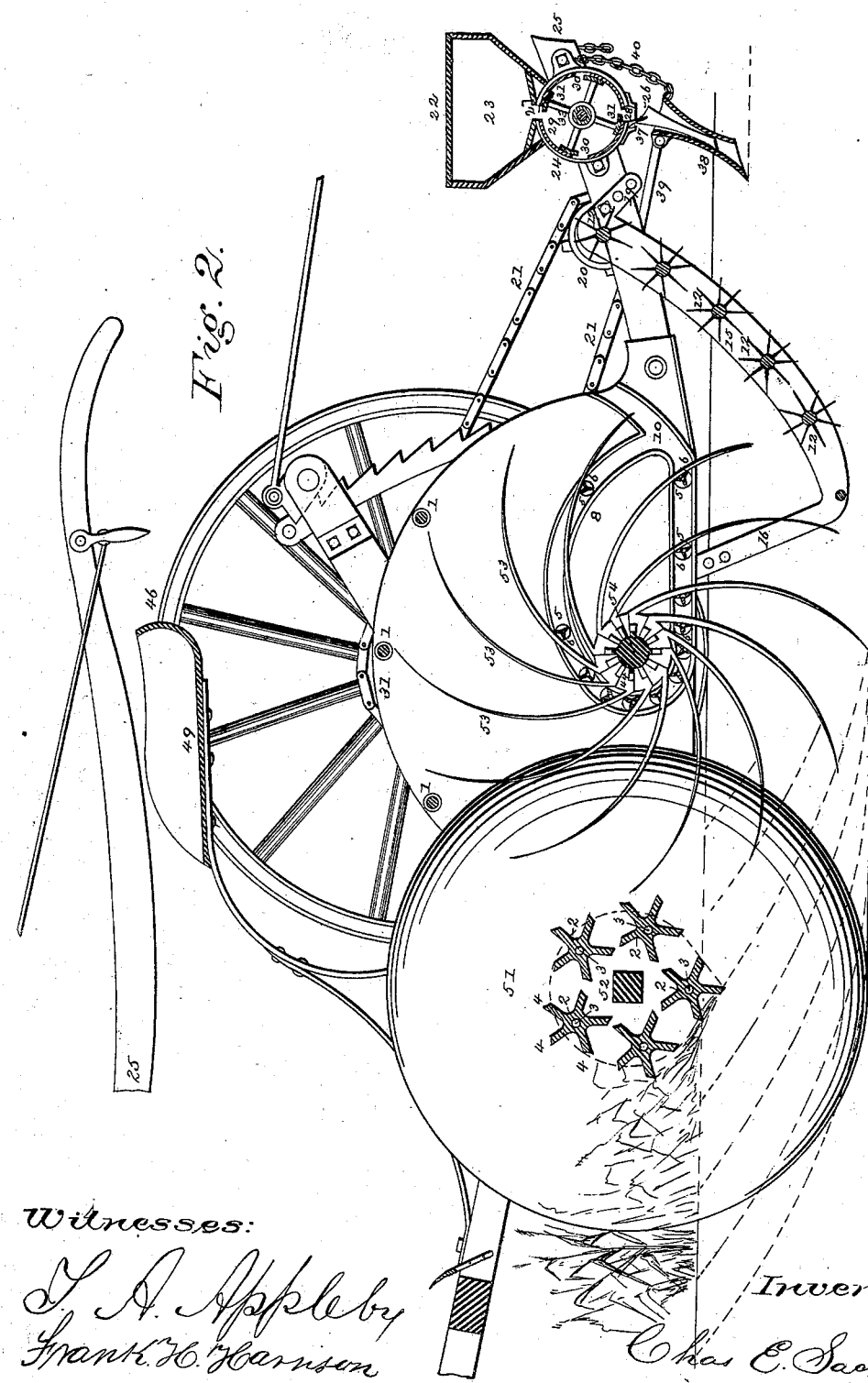

UNITED STATES PATENT OFFICE.

CHARLES E. SACKETT, OF MATILDA FURNACE, WAYNE TOWNSHIP, MIFFLIN COUNTY, PENNSYLVANIA.

IMPROVEMENT IN CULTIVATORS.

Specification forming part of Letters Patent No. 219,116, dated September 2, 1879; application filed September 27, 1878.

*To all whom it may concern:*

Be it known that I, CHARLES E. SACKETT, of Matilda Furnace, Wayne township, Mifflin county, and State of Pennsylvania, have invented certain new and useful Improvements in Cultivators or Rotary Plows; and I do hereby declare that the following specification, in connection with the accompanying drawings, is a full, clear, and exact description of the same.

In said drawings, Figure 1 is a side elevation of a tilling implement combining the improvements herein set forth and specifically claimed. Fig. 2 is a vertical section through the implement between any two of the revolving cutters. Figs. 3 and 8 show the plan and details of the revolving weed-cutters. Fig. 4 shows a portion of one of the spade-cleaners or earth-dischargers and its supporting-wheel in position across the revolving spades. Fig. 5 is a plan of the revolving sifting-grate. Fig. 6 is a side elevation of the revolving sifting-grate side frame, showing the gear-chamber and contained train of rotating gears. Fig. 7 shows the manner of fastening the revolving spades to their axis.

The invention includes combination of parts and details of construction, all of which will be hereinafter more fully set forth and specifically claimed.

This invention relates to improvements in that class of agricultural implements which are designed to prepare the earth either for planting crops or sowing grain, or to promote the growth of crops.

It consists in the following devices and combinations:

First. In a tilling implement combining two or more revolving cutters, (marked 51,) fixed upon a common roller or axis, 52, for the purpose of dividing the soil vertically in cultivation, the said roller or axis being divided into or surrounded by a number of smaller rollers, 2 2 2, turning upon their own axes 3 3 3, which smaller rollers are formed of three or more blades projecting from a common center, and having sharpened cutting extremities 4 4 4, which extremities present a constant series of cutting-edges to all weeds or stalks that may come in the path of the implement, and which not only aid the implement to travel by reducing the sliding friction upon the earth of a fixed revolving cutter-roller, but must inevitably, by the weight of the implement, which revolves upon their centers and forces their blades into the earth, cut, crush, and finely divide all weeds or stalks passing under them. It thus renders them much easier to be covered by whatever device is following for the purpose of turning the earth over them, as well as aids in the killing and decomposition of the weeds, which is also an object to be attained. The bolts 3 3 3, forming the axes of the weed-cutters, also serve to bolt the revolving cutters together and keep them in position.

Second. It consists in the combination, with a revolving spade or spades, 53, of a series of parallel bars, 5 5 5, so shaped as to form a bearing-surface both against the spade-faces and the contained earth, and one of which bars crosses the implement between each adjoining spade or line of spades and bears against the face of each. Each of these bars, which may be designated as spade-cleaners, is supported at either end by wheels 6 and 7, in which they are journaled, and which wheels run in an eccentric track formed by projecting pieces cast upon the inside of the side plates, 8 and 9, which plates are stayed apart and held in position by stay-bolts 1 1 1. The shape of this track is so devised that when the spades are taking up their load of earth the spade-cleaners are confined at the inner extremity of the spades. As the spades revolve the cleaners are carried around by the pressure of the faces of the spades against them. As they approach the delivery-point the cleaners, conducted by the track, commence to move out to the outer extremities of the spades, thus cutting the earth loose from the spades if it should be inclined to stick, and, by the pressure of the other face of the spade-cleaner, which may be constructed of any desired width, forcibly ejecting the earth from between the spades. At the outer extremities of the spades the cleaning-blades are arrested, and, still conducted by the track and forced by the pressure of the revolving spades, are returned to their inner extremities. At the point 10 an opening in the circular track permits of the spade-cleaners and their supporting-wheels being withdrawn and changed or used at pleasure.

Third. In a tilling implement combining a sifting-grate for the purpose of more finely dividing and sorting the material delivered thereon, it consists in the combination therewith, or substitution for fixed bars, of a series of rotating bars, 12 12 12, which bars are provided with teeth or harrow-points, fixed at suitable intervals and graded from small spaces between the teeth upon the upper bars to wider spaces upon the lower bars. These rotating bars are journaled at one end into small gear-wheels 13 13 13, to which they are keyed, and at the other end into one of the side frames, 11, of the sifting-grate, in which they revolve. The gear-wheels are brought into communication with each other by means of intermediate wheels, 14 14 14, and the whole train is confined in a dirt-proof gearing-box, 15, which also forms the other side frame of the sifting-grate. The upright pieces 16 17 at the one end and 18 19 at the other end of the sifting-grate side frames, being provided with adjustable holes, serve to regulate the inclination of the sifting-grate when bolted to the tilling implement, and from which it may be removed at pleasure. The upper rotating bar of the sifting-grate passes through its gear-wheel, to which it is keyed, and also through the outer side of the gear-wheel chamber, projecting therefrom a sufficient length to receive and terminate in a toothed chain-wheel, 20. A chain, 21, passing over this wheel, and around any convenient rotating point, as 31, on the tilling implement, furnishes the power that keeps the rotating bars in motion at any desired speed. By means of the intermediate wheels all of the toothed bars rotate in the same direction, and all the earth, weeds, or material met with in cultivation, falling thereon, if too large to pass between the upper spaces, will be moved down over the grate, by the action of the harrow-teeth, to the lower spaces, at the same time being further torn up and disintegrated into still finer earth. The whole mass will thus be continuously delivered in the furrow of the tilling implement in a condition for immediate planting—all coarse material below, and the earth graded to the finest top-dressing at the surface—thereby hastening the germination of the seed from two causes. It can be planted while the earth is yet moist from fresh turning, and it is also brought in close contact with the earth by reason of its fineness. Another element of quick and abundant growth will be the lightness and porosity of the soil.

Fourth. In a tilling implement combining revolving cutters, revolving spades, and a sifting-grate, my invention consists in the combination therewith of an automatic seed-sower, whereby the earth tilled shall be planted in the same continuous operation. The furrow or track of earth prepared by a tilling implement of this character being comparatively narrow, the weight of a seed-sower to sow the same width of track, or the power required to operate it, would be so small that it could readily be attached to any projecting part of the machine, and would not in any way impede its operation, being, for corn, confined to one working drill, and, for smaller grain, not more than four working drills. The operation of the device would be as shown in Figs. 1 and 2, wherein 22 is the seed-drill bolted between the handles of the implement; 23 is the receiving seed-chamber; 24, a tight barrel, upon which it is mounted and with which it communicates through the opening 27, and, at 28, with the delivery-tube. Within this barrel revolves an inner distributing-barrel, 29, having any convenient number of ports 30, which are closed more or less by means of slides 31, attached to arms 33, rotating on the same axis as the distributing-barrel, but having an independent motion of their own sufficient to close the ports of the distributing-barrel, or open them, so as to sow one or more bushels of seed to the acre. This motion is controlled by a hand upon a dial at the end and outside of the barrel 24, and which, when set and fixed in position by a set-screw, regulates and indicates the quantity being sown. The axis of the distributing-barrel is continued on one side through and beyond the side of the barrel 24, and terminates in a toothed chain-wheel, 34, to which it is keyed, and which is rotated at any desired speed by means of the chain 35 passing around any convenient rotating point, as 36, upon the tilling implement. The distributing-barrel being thus rotated the seed passes through the openings 27 28 in more or less quantity and falls in the trough 37, communicating with the flexible tube 26, and thence is delivered below the surface of the earth by the tubular hoe or drill 38. The tubular hoe is kept in position by the bar 39 and the chain 40, attached to the tilling implement, and which permits of the tubular drill being always in the earth, no matter what the depth of cut of the tilling implement, the flexible tube 26 insuring the proper delivery of the seed to the tubular hoe.

My invention consists, finally, in the manner of attaching the curved blade 53 to its axis 54. This blade has two slots, 40 41, punched at either side near its root. In these slots are inserted lugs 42 43, cast on a wedge-shaped casting, 44, which, when attached to the blade, forms one of the members of a series of wedges and blades similarly attached, that would complete a solid circle around the axis 54.

A certain number of the blades are slightly shorter than the rest, to allow of lugs formed upon the shaft or axis 54 engaging with the blades. The wedges 44 are slightly wider than the blades, which extra width forms the support on each side of a pair of segmental rings, 45 46, bolted together, which confine the entire circle of blades and wedges in position. Alternate segments of each pair of rings cross each other. The width of the wedge only extends to the center of each pair of rings; consequently the removal of any one segment permits of any one blade and its attendant wedge being withdrawn without disturbing the capacity of the remaining segments of the rings to confine the remaining blades and wedges in position.

The implement is supported in an upright position by the revolving cutter-rollers and the supporting-wheels 46 46, which rest upon the earth. It admits of no deviation from the path in which it is drawn. Therefore there is no requirement for the operator to walk behind it, or to be present there, except in turning corners, or to raise the revolving cutters and revolving spades from the earth, when they are retained in position by the self-acting catch 47 and pin 48.

The seat is supported by the hounds 55, attached to the draft-bars 56, which gives the combination a further value in throwing the weight of the operator directly upon the revolving cutters, thereby helping to force them into very tough sod or earth.

What therefore is claimed is—

1. In a tilling implement combining two or more revolving cutters, 51, revolving with a central roller or axis, 52, the subdivision of that roller into, or the surrounding of that axis by, a number of smaller rollers, 2, rotating on independent axes 3, and having sharpened cutting-edges 4, that serve to cut up, crush, or disintegrate the weeds, stalks, or other field growth that may pass between said revolving cutters, substantially as described and shown.

2. In a tilling implement combining a revolving spade composed of one or more rotating blades, 53, the combination therewith of a series of parallel bars, 5, their supporting-wheels 6 and 7, eccentric track, and side plates 8 and 9 for projecting and withdrawing the spade-cleaners and forcibly ejecting the earth at each revolution, substantially as described and shown.

3. In a tilling implement having a revolving or fixed spade, the combination therewith of a sifting-grate of unequal spaces, the revolving toothed bars 12, with gear-train 13 and 14, the side frames 11 and 15, the latter provided with an inclosed gear-box, the chain 21, and chain-wheels 20 and 31, substantially as shown and described.

4. In a tilling implement combining a revolving cutter, a revolving spade, and a sifting-grate, the combination therewith of an automatic seed-drill, of a convenient device for planting the earth at the same time as tilling it, and in one continuous operation, substantially as described and shown.

CHARLES E. SACKETT.

Witnesses:
T. A. APPLEBY,
FRANK. H. HARRISON.